Patented Sept. 28, 1943

2,330,286

UNITED STATES PATENT OFFICE 2,330,286

PROCESS FOR ACCELERATING THE HARDENING OF HARDENABLE RESINS AND NEW COMPOSITION OF MATTER

Herbert Hönel, Detroit, Mich., assignor, by mesne assignments, to Reichhold Chemicals, Inc., Detroit, Mich., a corporation of Delaware No Drawing. Application November 10, 1939, Serial No. 303,918. In Germany February 10, 1939

10 Claims. (Cl. 260—34)

My invention relates to certain new and useful improvements in the field of thermo-setting condensation products. More particularly my invention relates to the acceleration of the transition of the heat-hardening (thermo-setting) condensation products into the high molecular stage by the addition of partial esters of phosphorus-oxygen acids. A specially adapted and preferred method for preparing such partial esters is described e. g. in my copending application Serial No. 303,917 filed Nov. 10, 1939, now Patent No. 2,272,668, dated Feb. 10, 1942. By the term "thermosetting" condensation products I understand still soluble and fusible, liquid or solid resins which, upon heating, are transformed into insoluble and infusible high-molecular stages. Furthermore by said term I also understand combination products obtained merely by mixing or more or less chemically interacting hardenable condensation products with other liquid or solid resins, oils, etc. which generally act as plasticizing agents which however are to be used in such restricted proportion that upon sufficient action of heat an insoluble and infusible combination product is finally obtained.

As is known, the transition of heat-hardening resins into the infusible, insoluble stage can be catalytically promoted by the addition of acids. This is especially true for phenolic resins of the heat hardening type ("resols") where strong mineral acids have been used, and for urea-formaldehyde resins, where certain organic acids can be used also.

Acids have also been added to solutions of thermo-setting resins, by which means varnishes have been obtained which set even at ordinary temperature.

My present invention means a considerable technical progress due to certain advantages as compared with previous procedures. I especially refer to the following advantages which result from using partial esters of phosphoric acids:

The degree of acidity (hydrogen-ion concentration, generally measured as pH) is sufficient to bring about said transition into the high molecular, insoluble stage, even at ordinary temperature; on the other hand, most metals (particularly iron) are not attacked, neither are wood, paper, cardboard, clothes, etc. This is of special importance when using such esters as accelerators in varnishes, impregnants, and the like.

I have found that by choosing suitable solvents, particularly alcoholic solvents, the hydrogen-ion concentration can be reduced to such an extent as practically to eliminate the catalytic action of said esters entirely, which only appears during and after evaporation of the solvent. This means that I can obtain varnishes which harden even at ordinary temperature when they are supplied but which can be stored for a long time before use without deterioration of the varnish. In the past it has been necessary to use such a varnish immediately after the addition of the accelerator heretofore used.

Hence, it is feasible to handle and store varnishes which contain accelerators according to my invention, as well as the accelerator itself, in ordinary tin containers, whereas in the past glass-lined containers had to be used on account of the corrosive action of the accelerator heretofore employed.

Another advantage of my invention consists in the absolute or nearly absolute water insolubility of numerous partial phosphoric esters. Generally, they are soluble in alcohols and in mixtures of alcohols with hydrocarbons; in many cases, also in hydrocarbons alone; further, in ketones, esters, etc.

Another surprising great advantage is brought about by these partial esters, particularly when employed in urea-resin varnishes, for they evidently act as flowing agents. By means of my process I have succeeded in obtaining varnishes which yield an absolutely even surface and extremely high gloss, even if low boiling solvents with high evaporation ratio are exclusively employed which cause an extremely rapid setting.

The production of partial phosphoric esters can be carried out in many different ways. By the proper choice of starting materials and procedure almost any desired solubility or compatibility and other properties necessary for the different cases can be achieved. It is not necessary nor even desirable to use well-defined, purified esters, for they often tend to disturbing crystallization, and it is an object of my invention to prepare and use such compounds which do not exhibit this tendency, in other words which are distinguished by a definite colloidal nature and certain solubility characteristics. It is, however, advantageous to eliminate in a suitable manner any traces of free phosphoric acid accidentally present. For instance, I mention a mixture consisting of mono- and dialkyl phosphoric esters which may also contain small proportions of meta- and pyrophosphoric esters. Such a mixture has the appearance of a low viscous oil. By the choice of adapted conditions also highly viscous or even resinous, plastic, partial esters are formed which evidently are of high molecular complexity; the advantage of using such products becomes evident in the finally obtained composition or in the varnish film and the like. As I have found and as will easily be understood primary phosphoric esters are stronger accelerators than secondary ones. They are however of more pronounced hydrophilic character than the latter. If water insoluble and fairly water resistant end products, coatings and the like are aimed at I prefer phosphoric esters with long chain alkyl- or aryl radicals.

The simplest and most adaptable ways for obtaining partial phosphoric esters, consists in interacting alcoholic or phenolic compounds with phosphorus pentoxide or with metaphosphoric acid, the reaction simply being additive. I have found that high molecular compounds may be obtained in a simple way by interacting phosphorus pentoxide with polyvalent hydroxy compounds. Castor oil or hydrogenated castor oil are particularly suitable and inexpensive examples which at the same time yield fairly water resistant products. Other suitable polyhydric alcoholic compounds which also yield water resistant products are long chain glycols, e. g., octadecadiol (1,9) (obtained from catalytic hydrogenation of ricinoleic acid) or alkyd resins containing free hydroxy groups, such as are prepared by the use of an excess of glycerol. The products obtained by interacting phosphorus pentoxide with polyhydroxy compounds are of substantially higher molecular size than the polyhydroxy compounds themselves. This evidently is due to the polyfunctional mechanism of the reaction which leads to chain-like connections in a way analogous to the formation of the so-called alkyd resins.

It forms an object of my invention that the properties of the partial phosphoric ester to be used, particularly its solubility and compatibility, must be adapted to the different cases which can easily be done by suitable choice of the organic ester forming component. I have found that partial phosphoric esters obtained, e. g., by interacting phosphorus pentoxide with short chain glycols or with phenols are perfectly compatible with resols derived from ordinary phenol (hydroxy benzene). For accelerating the hardening of water soluble urea resins I have successfully employed water soluble viscous products such as are obtained according to Example 1 of my copending application Ser. No. 303,917 from short chain glycols. These products impart a suitable plasticity to the urea resins which otherwise after hardening are very brittle. Alcohol soluble urea resins however, generally prepared in the presence of alcohols, e. g., from dimethylol urea are also compatible with relatively water insoluble higher alkyl phosphates. Urea resins obtained, e. g., by sufficiently prolonged treatment with butanol or higher alcohols are also compatible with long chain phosphoric esters, e. g., those deriving from castor oil. The compatibility of the accelerators with benzene and petroleum hydrocarbons is the better the more pronounced their aliphatic character.

The proportion of the accelerators to be employed of course depends upon the active acidic groups actually present per weight unit and moreover widely varies according to the hardening capacity of the thermo-setting resin and the temperature and time in which the hardening reaction is to be completed.

The following examples further illustrate my invention.

Example 1

75 grams of an almost solid resin obtained from 1000 grams of phenol and 1600 grams of formaldehyde in the presence of a strong alkali, and 25 grams of the product according to Example 5 of my copending application Ser. No. 303,917, from 70 parts of resorcinol and 60 parts of phosphorus pentoxide, are diluted in 250 grams of alcohol. A varnish is obtained which sets in a few minutes and hardens in 4–8 hours to an extremely tough and hard film. The same is also distinguished by a fairly even surface and much better flexibility and adhesion than is, e. g., the case by simply adding hydrochloric acid or other acids heretofore used for accelerating the hardening process.

The accelerator employed in this example may be replaced with similar results, e. g., by the product obtained according to Example 1 of my copending application Ser. No. 303,917, or, e. g., by an interaction product of 10 grams of phosphorus pentoxide and 20 grams of tricresol prepared in a similar way, or by 20 grams of a partial mixed ester obtained from metaphosphoric acid, phenol and cresol.

Example 2

The dry viscous condensation product obtained from 200 parts of diphenylol menthane, 100 parts of p-tert. butyl phenol and 300 parts of formaldehyde (40% vol.) with the aid of caustic alkali at ordinary temperature is blended with the highly viscous interaction product obtained according to Example 3 of my copending application Ser. No. 303,917 from 30 parts of phosphorus pentoxide and 210 parts of castor oil. This blend yields an insoluble highly elastic rubbery mass resembling linoxyn, when heated, e. g., at 80° C. for 2 hours. When mixed with fillers, pigments, it may, e. g., serve as a substitute for linoleum, etc.

Example 3

Such long chain phosphates are also suitable accelerators in other cases where a maximum of resistance against physical and chemical attacks is desired. E. g., a heat hardening varnish is prepared by interacting a resol obtained from 100 parts of 1-3-5-isothymol, 120 parts of formaldehyde with 100 parts of converted castor oil (so-called Dienol) at temperatures above 100° C. until a homogeneous almost solid combination product is attained. This is dissolved in an appropriate quantity of a solvent. Upon addition of an accelerator, e. g., prepared by interacting 0.5 part of metaphosphoric acids or phosphorus pentoxide with three parts of castor oil, a varnish is obtained which yields an extraordinarily hard and resistant coat after baking for 1 hour at 120° C. Without addition of the accelerator it hardens only at about 180° C. in the same time.

The proportions given in the foregoing examples, although they have proved to be particularly suitable, must yet not be regarded as restrictive, but one can more or less deviate therefrom. Also the coemployment of suitable proportions of other plasticizing substances is often advantageous, such as neutral phosphoric esters, alkyd resins, and the like.

In the following claims the term "acid-setting convertible resins" is intended to comprise only that group of thermosetting resins which by the addition of acids due to progressive condensation are converted into products of substantially higher molecular stages generally insoluble in ordinary solvents.

What I claim is:

1. A process of accelerating the hardening of an alkylated resol which comprises adding to the resol a preformed acidic partial phosphoric ester obtained by interacting phosphorus pentoxide with castor oil, in a proportion insufficient to produce the triester.

2. A composition of matter comprising an alkylated resol and a preformed acidic partial aliphatic phosphoric ester having plasticizing properties which is obtained by interacting phosphorus pentoxide with organic hydroxy compounds consisting partially at least of polyhydroxy compounds, in a proportion insufficient to produce the triester.

3. Accelerating the hardening of acid-setting convertible resins by adding preformed acidic partial phosphoric esters having plasticizing properties obtained by interacting phosphorus pentoxide with organic hydroxy compounds consisting partially at least of polyhydroxy compounds.

4. A process for accelerating the hardening of acid setting convertible resins, which comprises adding thereto a preformed acidic partial ester having plasticizing properties, obtained by reacting a member of a group consisting of phosphoric acids and anhydrides with a quantity of an organic polyvalent hydroxy compound in a proportion insufficient to produce the neutral ester.

5. A process as set forth in claim 4 wherein the resin is a resol.

6. A process as set forth in claim 4 wherein $P_2O_5$ is reacted with a polyvalent organic hydroxy compound to form the partial ester.

7. A process for accelerating the hardening of acid setting convertible resins, which comprises adding thereto a preformed acidic partial ester having plasticizing properties obtained by reacting phosphorus pentoxide with a quantity of castor oil insufficient to produce the neutral ester.

8. A composition of matter comprising an acid setting convertible resin and a preformed accelerator and plasticizer for said resin, comprising an acidic partial phosphoric ester obtained by reacting a member of a group consisting of phosphoric acids and anhydrides with an organic polyvalent hydroxy compound in a proportion insufficient to form a neutral ester.

9. A composition of matter comprising a resol and a combined accelerator and plasticizer, comprising a preformed acidic partial phosphoric ester derived from phosphorus pentoxide and an organic polyhydroxy compound in a proportion insufficient to produce a neutral ester.

10. A composition of matter comprising an acid setting convertible resin and a preformed acidic accelerator and plasticizer for said resin obtained by reacting $P_2O_5$ and castor oil in insufficient quantity to form a neutral ester.

HERBERT HÖNEL.